United States Patent [19]
Hohlbein

[11] Patent Number: 5,991,958
[45] Date of Patent: *Nov. 30, 1999

[54] CONTOURING TOOTHBRUSH HEAD

[75] Inventor: Douglas J. Hohlbein, West Trenton, N.J.

[73] Assignee: Colgate-Pamolive Company, Piscataway, N.J.

[*] Notice: This patent is subject to a terminal disclaimer.

[21] Appl. No.: 09/090,331

[22] Filed: May 29, 1998

Related U.S. Application Data

[63] Continuation of application No. 08/762,783, Dec. 10, 1996, Pat. No. 5,758,383
[60] Provisional application No. 60/008,734, Dec. 29, 1995.

[51] Int. Cl.[6] ........................................... A46B 9/04
[52] U.S. Cl. ............................................. 15/167.1; 15/172
[58] Field of Search .................................. 15/167.1, 172

[56] References Cited

U.S. PATENT DOCUMENTS

| | | | |
|---|---|---|---|
| 1,927,365 | 9/1933 | Frolio | 15/167.1 |
| 2,254,365 | 9/1941 | Griffith et al. | 15/167.1 |
| 3,188,672 | 6/1965 | Gary | 15/167.1 |
| 3,320,225 | 5/1967 | Bradbury . | |
| 3,900,550 | 8/1975 | Oliver . | |
| 4,563,381 | 1/1986 | Woodland . | |
| 4,691,405 | 9/1987 | Reed | 15/167.1 |
| 4,712,266 | 12/1987 | Yamaki . | |
| 5,114,214 | 5/1992 | Barman . | |
| 5,371,915 | 12/1994 | Key | 15/167.1 |
| 5,373,602 | 12/1994 | Bang | 15/167.1 |
| 5,465,450 | 11/1995 | Humphries | 15/172 |
| 5,483,722 | 1/1996 | Scheier et al. | 15/167.1 |
| 5,502,930 | 4/1996 | Burkette . | |
| 5,651,158 | 7/1997 | Halm | 15/167.1 |
| 5,742,972 | 4/1998 | Bredall | 15/167.1 |
| 5,758,383 | 6/1998 | Hohlbein | 15/167.1 |

OTHER PUBLICATIONS

"Poly–Pro Propylene" "The Integral Hinge", Spencer Chemical Co. (1963).
"Guide for Injection Molding Pro–fax Polymopylene" (1987).
"Construeren in Kunststoffen Deel B", T. Delft (1986).

*Primary Examiner*—Terrence R. Till
*Attorney, Agent, or Firm*—Richard Ancel; Henry S. Goldfine

[57] ABSTRACT

A toothbrush having two head sections, the sections being normally biased to assume an angle with respect to each other, to thereby define a generally concave bristle tip configuration. The two sections of the head have facing ends joined by a thin bridge section integral with the two heads. In one embodiment, there is one bridge section near the lower surface of the head. In another embodiment, there are two longitudinally spaced bridge sections each near the lower head surface. In a third embodiment, the bridge section is a thin integral connection between facing ends of the two sections. In other embodiments, the two head sections are normally aligned and are also joined by a thin, integral bridge section, with the bristles of the head section most remote from the handle being of uniformly different lengths. The space between the two facing ends is filled with an elastomer, typically SANTOPRENE (brand). The two head sections define an articulated head. In yet another embodiment, the bridge section is omitted.

7 Claims, 3 Drawing Sheets

CONTOURING TOOTHBRUSH HEAD

This application is a continuation of application Ser. No. 08/762,783, filed Dec. 10, 1996, now U.S. Pat. No. 5,758,383, which claims priority under 35 U.S.C. § 119(e) of provisional application No. 60/008,734, filed Dec. 29, 1995, which applications are incorporated by reference herein.

BACKGROUND OF THE INVENTION

This invention relates to a toothbrush and more particularly to a toothbrush head construction wherein the head is designed and configured to yield a brushing surface conforming to curved sections of teeth and which is bendable to conform to straight teeth sections.

Prior toothbrush constructions include toothbrush heads having pivoted or articulated sections joined together in a variety of constructions, such as a resilient strip of metal or the like, and also include pivoted or hinged articulated sections to provide a curved bristle configuration.

A curved/angled bristle surface configuration offers improved access to hard-to-reach areas such as the lingual surfaces of the front teeth, and behind the rear molars, placing more bristles in contact with the outer surfaces of the front teeth.

Many current brushes which have rigidly mounted bristles and a rigid curved/angled bristle surface exhibit an inherent disadvantage when brushing both flat as well as concave tooth surfaces. Placing a curved/angled bristle surface on flat tooth surfaces results in fewer bristles making contact with the teeth. These fewer bristles must support the brushing forces applied through the handle, which will result in premature splaying of the bristles. Some current toothbrushes have a "power tip" configuration (elongated rigidly mounted tip bristles) which are claimed to have improved access benefits.

SUMMARY OF THE INVENTION

According to the invention, an articulated toothbrush head is defined by two head sections joined by one or more thin bridges of the same resin from which the toothbrush is formed, as by molding, to produce an integral construction. These thin bridges permit limited flexing between the two head sections, the two sections normally being at a small angle with respect to each other. That portion of the head between the two head sections may be, in one embodiment, in the general form of a T shaped slot running transversely of the top surface of the head, from one side head side edge to another. The slot is filled, as by injection, with an elastomer to control and enhance flexing. The construction is such that the head section most remote from the handle is normally tilted with respect to the head section nearest the handle, the latter head section located at one end of the handle. In a second embodiment, the head section may assume the form of a narrow cylindrical portion, or in a third embodiment two thin bridges may be employed, both having elastomer.

An advantage of the present flexible configuration is, in addition to the above noted features of a curved configuration, its inherent gentleness on the gums. When one brushes along the gumline with a power tip configuration, one focuses much of the force through the concentrated area at the raised tip. With the present configuration, this force is more evenly distributed.

There are considerable manufacturing efficiencies with having the elastomer material of this invention used in the flex area being the same elastic material as that which may be used as a grip material in the handle area. Therefore, a configuration which allows flexing under the loads typically encountered during brushing with materials which are suitable for use as a grip would be desirable.

To achieve the flexibility described above, the cross section of elastomer may be convoluted, with one or more convolutes. To aid in fixing the elastomer to the toothbrush head sections, the elastomer may be configured to fit into one or more slots at both ends of the flexing area.

To minimize the gap between bristle tufts when the head is flexed into a flat configuration, it is desirable to position the plastic (resin) bridge between the tip and handle portions as near the bristle tips as possible. This bridge is straightened during flexing, and directly controls the gap between bristle tufts on each side of the flex area.

DETAILED DESCRIPTION OF THE INVENTION

Figure 1:
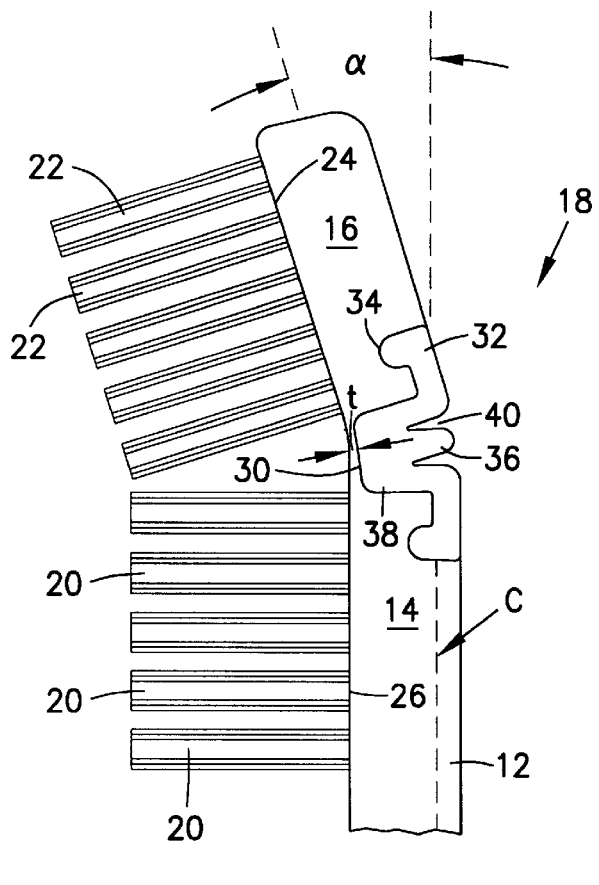
FIG. 1 is a side elevational view illustrating the toothbrush head of this invention according to a first embodiment.

Referring now to FIG. 1, a side elevational view of a toothbrush embodying the features and construction of this invention is shown in a vertical position, with a portion of the handle designated as 12. While not completely shown, the reader will understand that the handle extends downwardly and has a longitudinal axis. That portion of the head nearest the handle is designated as section 14 and is collinear with the handle, while that portion of the head most remote from the handle is designated as section 16. An elastomer section or joint between facing ends of sections 14 and 16 is denoted generally as 18. A plurality of tufts of bristles 20 extends at right angles to section 14, while a similar plurality of tufts of bristles 22 extends at right angles from section 16. Tufts of bristles 22 are thus at right angles to lower surface 24 of head section 16, while tufts of bristles 20 are perpendicular to lower or bottom surface 26 of head section 14.

Figure 2:
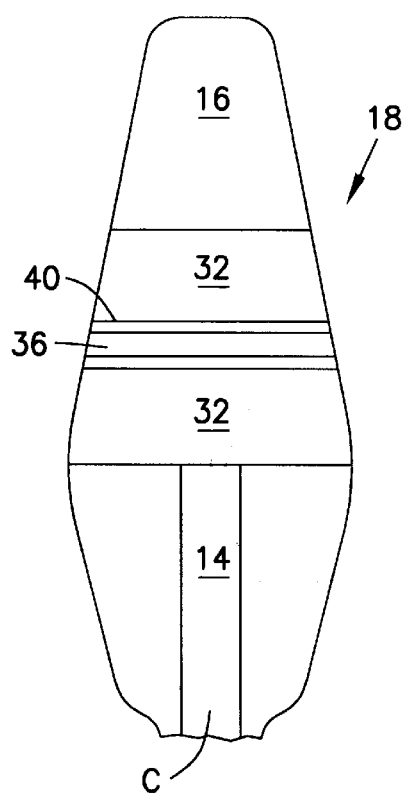
FIG. 2 is a top plan view of the toothbrush head shown at FIG. 1.

A generally T-shaped groove, in longitudinal cross section, is extends transversely across the upper or top surface of the head and is thus located between sections 14 and 16. The bottom of the central or main part of the groove is spaced from the lower surface of the composite head, leaving a thickness or bridge section designated as 30 which joins the lower portions of the two head sections. Bridge or zone 30 is typically of a thickness t between 20 and 40 thousandths of an inch. The handle and head sections are molded from a plastic or resin such as polypropylene. The generally T shaped groove is filled with a resilient and soft thermoplastic elastomer. The T groove has two symmetrical wing portions 32, each terminating in an enlarged portion 34, the latter extending towards respective groups of tufts of bristles. The middle of the T shaped resin insert section 18 includes an integral ridge 36, while the lower portion or base portion of the T section is designated as 38. The thermoplastic elastomer which forms section 18 may be a thermoplastic vulcanate (TPV) consisting of a mixture of polypropylene and EPDM (ethylene propylene diene monomers) which is available as SANTOPRENE (brand), described in U.S. Pat. No. 5,393,796 issued to Halberstadt et al, or VYRAM (brand), another TPV consisting of a mixture of polypropylene and natural rubber, both SANTOPRENE and VYRAM (brands) being elastomers marketed by Advanced Elastomer Systems. Other suitable elastomers include KRATON, a brand of styrene block copolymer (SBC) marketed by Shell, and DYNAFLEX G 2706 (brand), a thermoplastic elastomer marketed by GLS Corporation and which is made with KRATON (brand) polymer. These and other suitable elastomers have, typically, a Shore A hardness of from about 13 to 94, with about 29 being a preferred hardness. Grooves 40, on the top surface of the composite head, extend on both sides of raised rib or ridge 36, and border sections 32. FIG. 2 further illustrates the construction. It is seen that elastomer section 18 spans the width of the head sections.

In the normal configuration of the head, it is seen that head section 16 is tilted with respect to head section 14 at an angle a, typically about 18°. Thus, a force exerted on the brush during brushing is required to tilt section 16 if it is to be more nearly or completely aligned with section 14. The two head sections may be molded in their angled configuration as shown at FIG. 1, with the elastomer then added. Alternatively, the two head sections may be molded aligned with each other and then angled upon locating or injecting the elastomer between them.

Figure 3:
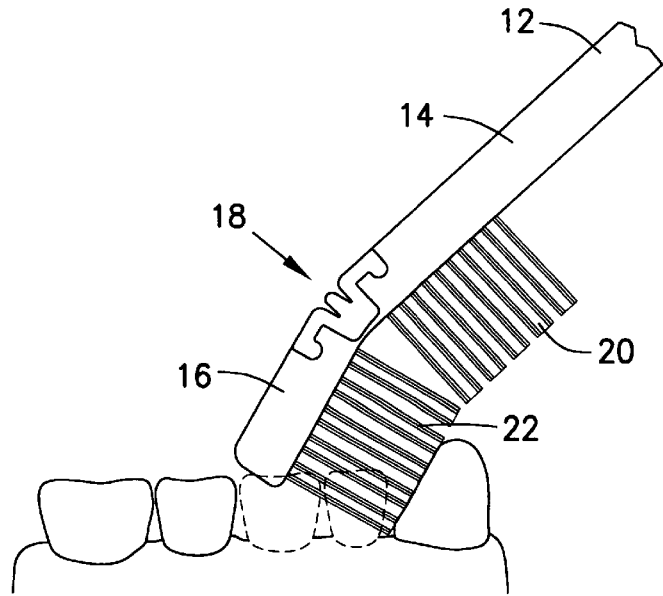
FIG. 3 is an elevational view showing the head and tufts of bristles as brushing the inside surfaces of the lower teeth.

Referring now to FIG. 3, it is seen that the effective curvature of the two head sections 14 and 16 offers improved access to inner and rear surfaces of the teeth. Thus, handle 12 need not be inclined as much as otherwise in order for forward section 16 and its bristles 22 to engage interior surfaces of the lower front teeth. In brushing a straight section of teeth, the deformability of the elastomer section 18 permits section 16 to partially or completely align itself with handle 12 and section 14.

Figure 4:
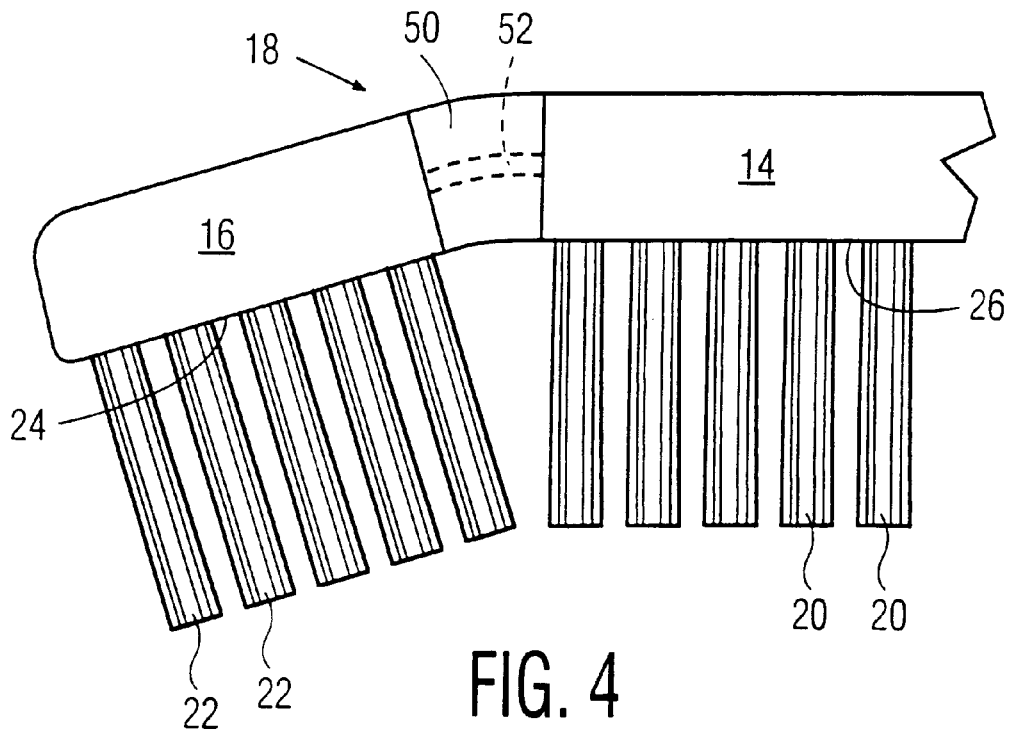
FIG. 4 is a view similar to FIG. 1 and slows an second embodiment.

FIG. 4 illustrates a second embodiment of the invention, there shown as horizontally disposed, and similar to that of FIGS. 1 and 2 except for a different construction for angularly joining the two head sections. The elastomer joint is again denoted as 18, with the elastomer itself denoted as 50 and being of the same composition as previously set out, and extends across the width of the head, and is located between the facing ends of sections 14 and 16. A thin integral bridge connection centrally between the two sections is designated as 52, typically being of cylindrical form in transverse cross section. Each end is integral with a respective head section. The elastomer is seen as completely surrounding bridge 52. This bridge connection may be, in transverse cross section, of any desired form. A top plan view of the head would be similar to FIG. 2, except for the absence of grooves 40 and rib 36. As seen at FIG. 4, the extent of the elastomer along the toothbrush longitudinal axis is shorter than that of FIGS. 1 and 2. Integral connection or bridge 52 performs the same function as bridge 30 of FIG. 1, namely, integrally joining the two head sections.

Figure 5:
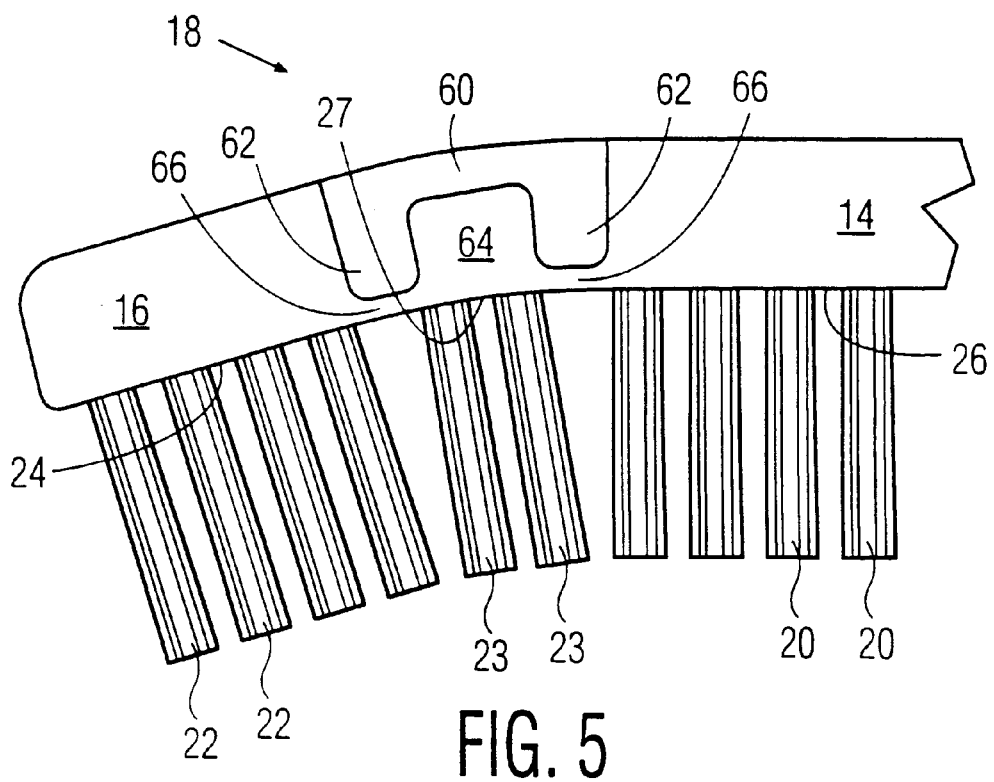
FIG. 5 is a view similar to FIG. 1 and shows a third embodiment.

FIG. 5 shows a third embodiment, again shown as horizontal. There, the lower surfaces 24 and 26 of bristled head sections 14 and 16 are joined by an intermediate arcuate bottom surface 27 having tufts of bristles 23 extending orthogonally and downwardly therefrom. An elastomer section 18 is generally C shaped and has a bight part 60 and tips or ends 62, the latter located in respective complementary double troughs or double grooves which extend transversely across the head. The elastomer tips are separated by head portion 64, with thin bridges 66, again formed from the molded resin forming the toothbrush, joining the two head sections at the lower surface of the whole head. The C shaped elastomer thus surrounds portion 64 across the width of the head.

The second and third embodiments yield the same cleaning action as shown at FIG. 3. The thickness of bridges 52 and 66 is the same as that of bridge 30 of FIG. 1.

It is seen that the bridges 30, 52 and 66 of the respective embodiments inhibit longitudinal separation of the two head sections by resisting tensile or other forces which might result in such separation, while the elastomer also controls the degree of flexing when head section 16 is subject to brushing forces. The function of the bridges is thus to tether the two head sections together, as well as to set them at an initial angle. When the sections move toward straightening or alignment, each elastomer section is deformed. Such deformation is resisted by the elastomer and to a lesser extent by the resin (polypropylene) bridges so that the sections revert to their normal, angled relationship upon the cessation of brushing force on forwardmost section 16.

Figure 6:
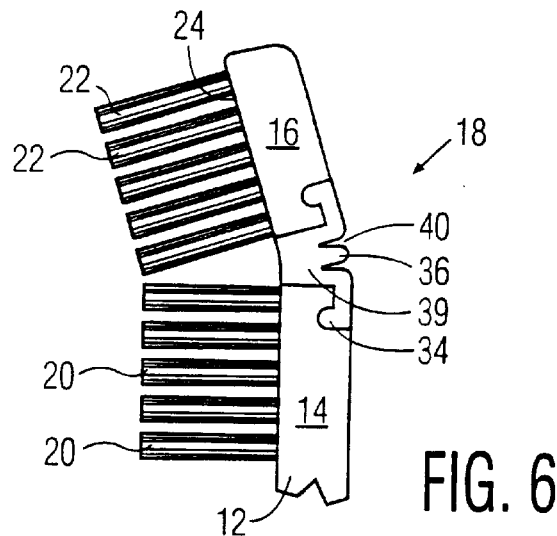
FIG. 6 is a side elevational view of a fourth embodiment.

FIG. 6 illustrates a fourth embodiment which differs from that shown in FIG. 1 only in the absence of bridge 30 of FIG. 1. Instead of bridge 30, the two head sections are coupled by T shaped elastomer section 39, the latter being of the same form as that of section 38 of FIG. 1, except that it extends all the way to the lower surface of the head.

Figure 7:
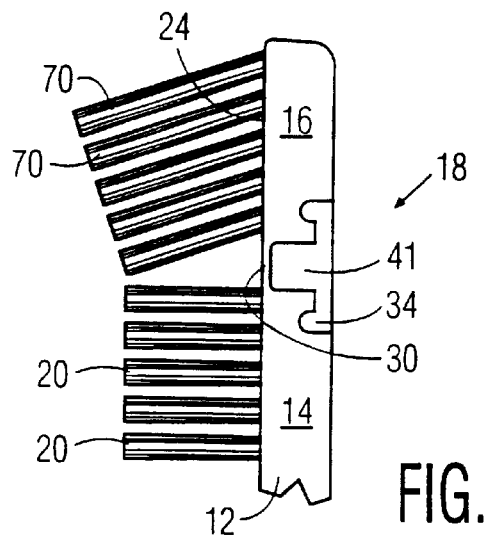
FIG. 7 is a side elevational view of a fifth embodiment.

FIG. 7 shows a fifth embodiment, here the two head sections 14 and 16 being normally aligned. A generally T shaped elastomeric section 41 forms a joint 18 which fills the spaces between the ends of the two head sections 14 and 16, except for bridge 30, identical with bridge 30 of FIG. 1, which integrally tethers the two head sections together. Tufts of bristles 70 are slanted with respect to lower head surface 24 of head section 16, the slanting being towards handle 12. Tufts 70 are of successively different lengths, with the longest being near the most remote free end or tip of the head section 16. It is seen that the tips of bristle tufts 70 and 20 form a generally concave brushing surface which is at times, during brushing, flattened upon bending of joint 18.

Figure 8:
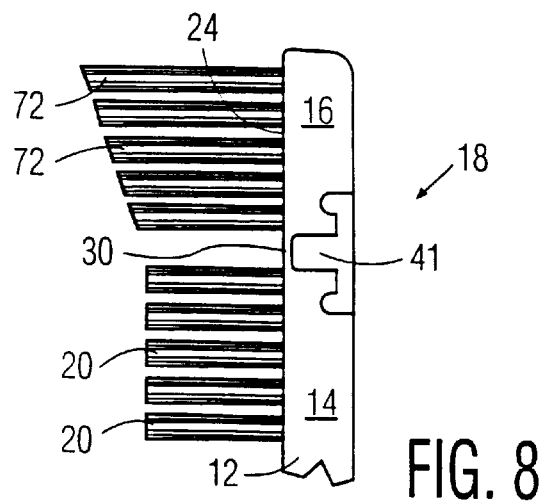
FIG. 8 is a side elevational view of a sixth embodiment.

FIG. 8 illustrates a sixth embodiment, similar to that of FIG. 7, and differs therefrom only in that the head section 16 tufts, here denoted as 72, extend orthogonally from surface 24. These latter tufts are, as tufts 70, of uniformly different lengths. The longest are near the free end of head section 16.

Again, the free ends of tufts 72 and 20 form a generally concave brushing surface which is at times, during brushing, flattened upon bending of joint 18.

Many toothbrushes available in the marketplace today are "dual component," by which is meant that an elastomeric material is used to a greater or lesser extent, particularly in the finger gripping portion of the brush. The method of manufacture of such dual component brushes by injection molding is thus exceedingly well known in the art today. The toothbrushes according to the present invention may be made by use of such conventional dual component technology. For example, in accordance with a first method of manufacturing brushes according to the present invention, the elastomeric material may be introduced into the head area from the handgrip area via a molded-in channel c (assuming a handgrip area is required). Alternatively, the elastomer could be introduced into the head area via a second injection point or gate located at the head, thereby eliminating the need for a molded-in channel. The head may then be tufted using conventional staple technology.

In accordance with a second method of manufacturing brushes according to the present invention, the handle and elastomer for the grip and the head areas are molded using a three-shot molding technique. The elastomer is introduced into the head area separately from the handgrip area. This process is especially useful if the elastomer for the head section of the brush and the hand grip section are different elastomeric materials, such as elastomers having two different Shore hardness values. For example, in some circumstances, it may be desired to use a softer elastomer for the head area than fore the handgrip portion of the brush. As above, the head may then be tufted using conventional staple technology.

I claim:

1. A toothbrush having a handle and an articulated head, said head having at least two adjacent sections to thereby define a composite head having an upper surface and a lower surface, said two sections having respective longitudinally spaced ends facing each other, said facing ends being separated by at least one groove in at least one head surface and joined by at least one bridge formed integrally with said sections, said head sections having a plurality of tufts of bristles extending from a bottom surface thereof, one of said head sections being coaxial with said handle, the other of said two head sections normally being at an angle with said handle, whereby said two head sections are normally at an angle relative to each other of about 18 degrees and normally bend toward alignment with each other during brushing.

2. A toothbrush having a handle and an articulated head, said head having at least two adjacent sections to thereby define a composite head having an upper surface and a lower surface, said two sections having respective longitudinally spaced ends facing each other, said facing ends being separated by at least one groove in at least one head surface and joined by at least one bridge formed integrally with said sections, said head sections having a plurality of tufts of bristles extending from a bottom surface thereof, and an elastomer section located between said spaced ends and filling said groove, wherein an elastomeric material is injected into the head area from the handgrip area via a molded-in channel extending from said handgrip area to said head area.

3. The toothbrush of claim 1, further comprising an elastomer section located between said spaced ends, which deforms whenever said two head sections bend relative to each other during brushing.

4. The toothbrush of claims 1 or 2, comprising only one groove and only two head segments.

5. The toothbrush of claims 2 or 3, wherein at least one groove extends from said head upper surface towards said head lower surface, said elastomer section filling said groove.

6. The toothbrush of claims 2 or 3, wherein said bridge is positioned substantially centrally between said facing ends and wherein the elastomer section surrounds said bridge.

7. The toothbrush of claims 1 or 2, wherein said bridge has a thickness of between about 20 and 40 thousandths of an inch.

* * * * *